(12) United States Patent
Kukde et al.

(10) Patent No.: US 12,380,910 B2
(45) Date of Patent: Aug. 5, 2025

(54) SYSTEMS AND METHODS FOR VIRTUAL MEETING SPEAKER SEPARATION

(71) Applicant: RingCentral, Inc, Belmont, CA (US)

(72) Inventors: Prashant Kukde, Milpitas, CA (US); Sushant Shivram Hiray, Maharashtra (IN)

(73) Assignee: RingCentral, Inc., Belmont, CA (US)

( * ) Notice: Subject to any disclaimer, the term of this patent is extended or adjusted under 35 U.S.C. 154(b) by 0 days.

(21) Appl. No.: 17/364,583

(22) Filed: Jun. 30, 2021

(65) Prior Publication Data

US 2023/0005495 A1   Jan. 5, 2023

(51) Int. Cl.
*G10L 21/0272*  (2013.01)
*G10L 25/51*  (2013.01)
*G10L 25/93*  (2013.01)

(52) U.S. Cl.
CPC .......... *G10L 21/0272* (2013.01); *G10L 25/51* (2013.01); *G10L 25/93* (2013.01)

(58) Field of Classification Search
CPC ...... G10L 21/0272; G10L 25/51; G10L 25/93
See application file for complete search history.

(56) References Cited

U.S. PATENT DOCUMENTS

| | | | |
|---|---|---|---|
| 10,467,307 B1* | 11/2019 | Chanda | G06F 16/248 |
| 2019/0180175 A1* | 6/2019 | Meteer | G10L 15/26 |
| 2020/0211544 A1* | 7/2020 | Mikhailov | G10L 15/16 |
| 2020/0335151 A1* | 10/2020 | Jung | G11C 11/4094 |
| 2020/0349954 A1* | 11/2020 | Yoshioka | G10L 15/30 |
| 2022/0044687 A1* | 2/2022 | Perret | G06N 3/045 |
| 2022/0148611 A1* | 5/2022 | Slapak | G10L 21/0264 |
| 2022/0221985 A1* | 7/2022 | Moore | G06F 3/04883 |

* cited by examiner

*Primary Examiner* — Richemond Dorvil
*Assistant Examiner* — Ethan Daniel Kim

(57) ABSTRACT

A computer-implemented machine learning method for improving speaker separation is provided. The method comprises processing audio data to generate prepared audio data and determining feature data and speaker data from the prepared audio data through a clustering iteration to generate an audio file. The method further comprises re-segmenting the audio file to generate a speaker segment and causing to display the speaker segment through a client device.

18 Claims, 10 Drawing Sheets

SYSTEMS AND METHODS FOR VIRTUAL MEETING SPEAKER SEPARATION

TECHNICAL FIELD

The present disclosure relates generally to the field of virtual meetings. Specifically, the present disclosure relates to systems and methods for separating multiple speakers during a video, audio, virtual reality (VR), and/or augmented reality (AR) conference.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Virtual conferencing has become a standard method of communication for both professional and personal meetings. Multiple people often join a virtual conferencing session from a single conference room for work. For personal use, a single household with multiple individuals often initiates a virtual conferencing session with another household with other members of the family. In such scenarios, separating each individual speaker in a room with multiple speakers becomes both a practical and a technical challenge. Such meetings often contain an unknown number of speakers, variability in speaker environments, overlaps in speech from different speakers, unbalanced talk time of individual speakers, and gender variability, all of which make speaker separation and identification during an active conferencing session difficult. Therefore, there is a need for an improved virtual conferencing system that automatically and intelligently separates multiple speakers.

SUMMARY

The appended claims may serve as a summary of the invention.

DETAILED DESCRIPTION

Figure 1:
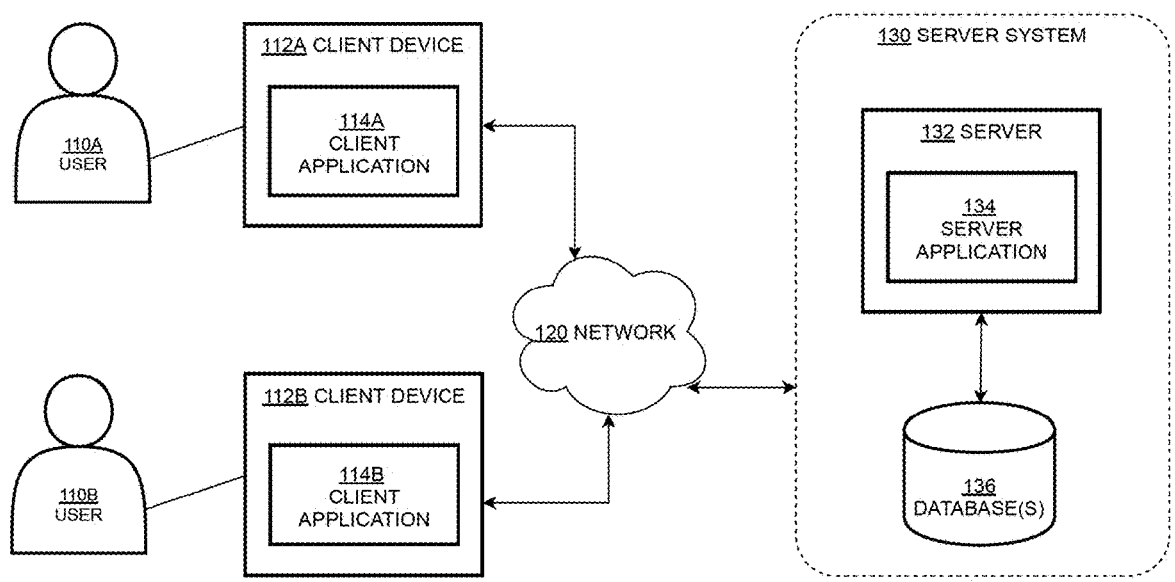
FIG. 1 is a network diagram depicting a networked collaboration system, in an example embodiment.

Before various example embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein.

It should also be understood that the terminology used herein is for the purpose of describing concepts, and the terminology is not intended to be limiting. Unless defined otherwise, all technical and scientific terms used herein have the same meaning as commonly understood by those skilled in the art to which the embodiment pertains.

Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that the singular forms of "a," "an," and "the" include plural references unless the context clearly dictates otherwise.

Some portions of the detailed descriptions that follow are presented in terms of procedures, methods, flows, logic blocks, processing, and other symbolic representations of operations performed on a computing device or a server. These descriptions are the means used by those skilled in the arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical, optical or magnetic signals capable of being stored, transferred, combined, compared, and otherwise manipulated in a computer system or computing device or a processor. These signals are sometimes referred to as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "storing," "determining," "sending," "receiving," "generating," "creating," "fetching," "transmitting," "facilitating," "providing," "forming," "detecting," "processing," "updating," "instantiating," "identifying", "contacting", "gathering", "accessing", "utilizing", "resolving", "applying", "displaying", "requesting", "monitoring", "changing", "updating", "establishing", "initiating", or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

A "computer" is one or more physical computers, virtual computers, and/or computing devices. As an example, a computer can be one or more server computers, cloud-based computers, cloud-based cluster of computers, virtual machine instances or virtual machine computing elements such as virtual processors, storage and memory, data centers, storage devices, desktop computers, laptop computers, mobile devices, Internet of Things (IoT) devices such as home appliances, physical devices, vehicles, and industrial equipment, computer network devices such as gateways, modems, routers, access points, switches, hubs, firewalls, and/or any other special-purpose computing devices. Any reference to "a computer" herein means one or more computers, unless expressly stated otherwise.

The "instructions" are executable instructions and comprise one or more executable files or programs that have been compiled or otherwise built based upon source code prepared in JAVA, C++, OBJECTIVE-C or any other suitable programming environment.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

Computer storage media can include volatile and non-volatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, solid state drives, hard drives, hybrid drive, or any other medium that can be used to store the desired information and that can be accessed to retrieve that information.

It is appreciated that present systems and methods can be implemented in a variety of architectures and configurations. For example, present systems and methods can be implemented as part of a distributed computing environment, a cloud computing environment, a client server environment, hard drive, etc. Example embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular data types. The functionality of the program modules may be combined or distributed as desired in various embodiments.

It should be understood, that terms "user" and "participant" have equal meaning in the following description.

Embodiments are described in sections according to the following outline:
1.0 GENERAL OVERVIEW
2.0 STRUCTURAL OVERVIEW
3.0 FUNCTIONAL OVERVIEW
   3.1 Preparation
   3.2 Iterative Hierarchical Clustering Analysis
   3.3 Re-segmentation and Display
4.0 PROCEDURAL OVERVIEW 1.0 GENERAL OVERVIEW Virtual conferencing sessions that feature multiple speakers from a single location present technical challenges for conferencing systems to correctly separate out and identify each individual speaker. In some instances, these virtual meetings have an unknown number of speakers joining from a single source (e.g. a single conference room), variability in speaker environments that create variability in audio quality, overlapping speech, unbalanced talk-times of individual speakers, and variability in gender. All these factors often cause an under-prediction or over-prediction of the number of speakers, the merging of non-homogenous speaker segments, and incorrect speaker turns when using existing methods for separating speakers. This low accuracy and reliability of speaker separation techniques creates a technical challenge that the presently describe approaches seek to address.

The current disclosure provides an artificial intelligence (AI)-based technological solution to the technological problem of separating multiple speakers. Specifically, the technological solution involves using a series of machine learning (ML) algorithms or models to accurately distinguish between and separate any number of speakers. Consequently, these solutions provide the technological benefit of increasing the accuracy and reliability of speaker separation in virtual conferencing systems. Since the conferencing system improved by this method is capable of accurately identifying and displaying speakers, as well as presenting more accurate transcriptions, the current solutions also provide for generating and displaying information that users otherwise would not have had.

In some embodiments, divisive hierarchical clustering and agglomerative hierarchical clustering are both performed in iterative steps in order to separate out each speaker, as further described herein. Using an agglomerative hierarchical clustering analysis alone often results in speakers incorrectly clubbed together due to their gender, environments (e.g. multiple speakers joining from the same noisy conference room), or some other identified features. Consequently, implementing a divisive hierarchical clustering to divide out audio segments based on features such as environment or gender before implementing agglomerative hierarchical clustering has the benefit of more accurate detection and separation of speakers, even those who speak for only a short duration throughout the course of a long meeting.

A computer-implemented machine learning method for improving a collaboration environment is provided. The method comprises processing audio data to generate prepared audio data. The method further comprises determining feature data and speaker data from the prepared audio data through a clustering iteration to generate an audio file. The method further comprises re-segmenting the audio file to generate a speaker segment and causing to display the speaker segment through a client device.

A non-transitory, computer-readable medium storing a set of instructions is also provided. In an example embodiment, when the instructions are executed by a processor the instructions cause processing audio data to generate prepared audio data, determining feature data and speaker data from the prepared audio data through a clustering iteration to generate an audio file, re-segmenting the audio file to generate a speaker segment, and causing to display the speaker segment through a client device.

A machine learning system for improving speaker separation is also provided. The system includes a processor and a memory storing instructions that, when executed by the processor, cause processing audio data to generate prepared audio data, determining feature data and speaker data from the prepared audio data through a clustering iteration to generate an audio file, re-segmenting the audio file to generate a speaker segment, and causing to display the speaker segment through a client device.

2.0 STRUCTURAL OVERVIEW

FIG. 1 shows an example collaboration system 100 in which various implementations as described herein may be practiced. The collaboration system 100 enables a plurality of users to collaborate and communicate through various means, including email, instant message, SMS and MMS message, video, audio, VR, AR, transcriptions, closed captioning, or any other means of communication. In some examples, one or more components of the collaboration system 100, such as client device(s) 112A, 112B and server 132, can be used to implement computer programs, applications, methods, processes, or other software to perform the described techniques and to realize the structures described herein. In an embodiment, the collaboration system 100 comprises components that are implemented at least partially by hardware at one or more computing devices, such as one or more hardware processors executing program instructions stored in one or more memories for performing the functions that are described herein.

As shown in FIG. 1, the collaboration system 100 includes one or more client device(s) 112A, 112B that are accessible by users 110A, 110B, a network 120, a server system 130, a server 132, and a database 136. The client devices 112A, 112B are configured to execute one or more client application(s) 114A, 114B, that are configured to enable communication between the client devices 112A, 112B and the server 132. In some embodiments, the client applications 114A, 114B are web-based applications that enable connectivity through a browser, such as through Web Real-Time Communications (WebRTC). The server 132 is configured to execute a server application 134, such as a server back-end that facilitates communication and collaboration between the server 132 and the client devices 112A, 121B. In some embodiments, the server 132 is a WebRTC server. The server 132 may use a Web Socket protocol, in some embodiments. The components and arrangements shown in FIG. 1 are not intended to limit the disclosed embodiments, as the system components used to implement the disclosed processes and features can vary.

As shown in FIG. 1, users 110A, 110B may communicate with the server 132 and each other using various types of client devices 112A, 112B via network 120. As an example, client devices 112A, 112B may include a display such as a television, tablet, computer monitor, video conferencing console, or laptop computer screen. Client devices 112A, 112B may also include video/audio input devices such as a microphone, video camera, web camera, or the like. As another example, client device 112A, 112B may include mobile devices such as a tablet or a smartphone having display and video/audio capture capabilities. In some embodiments, the client device 112A, 112B may include AR and/or VR devices such as headsets, glasses, etc. Client devices 112A, 112B may also include one or more software-based client applications that facilitate the user devices to engage in communications, such as instant messaging, text messages, email, Voice over Internet Protocol (VoIP), video conferences, and so forth with one another. In some embodiments, the client application 114A, 114B may be a web browser configured to enabled browser-based WebRTC conferencing sessions. In some embodiments, the systems and methods further described herein are implemented to separate speakers for WebRTC conferencing sessions and provide the separated speaker information to a client device 112A, 112B.

The network 120 facilitates the exchanges of communication and collaboration data between client device(s) 112A, 112B and the server 132. The network 120 may be any type of networks that provides communications, exchanges information, and/or facilitates the exchange of information between the server 132 and client device(s) 112A, 112B. For example, network 120 broadly represents a one or more local area networks (LANs), wide area networks (WANs), metropolitan area networks (MANs), global interconnected internetworks, such as the public internet, public switched telephone networks ("PSTN"), or other suitable connection(s) or combination thereof that enables collaboration system 100 to send and receive information between the components of the collaboration system 100. Each such network 120 uses or executes stored programs that implement internetworking protocols according to standards such as the Open Systems Interconnect (OSI) multi-layer networking model, including but not limited to Transmission Control Protocol (TCP) or User Datagram Protocol (UDP), Internet Protocol (IP), Hypertext Transfer Protocol (HTTP), and so forth. All computers described herein are configured to connect to the network 120 and the disclosure presumes that all elements of FIG. 1 are communicatively coupled via network 120. A network may support a variety of electronic messaging formats and may further support a variety of services and applications for client device(s) 112A, 112B.

The server system 130 can be a computer-based system including computer system components, desktop computers, workstations, tablets, hand-held computing devices, memory devices, and/or internal network(s) connecting the components. The server 132 is configured to provide collaboration services, such as telephony, video conferencing, messaging, email, project management, or any other types of communication between users. The server 132 is also configured to receive information from client device(s) 112A, 112B over the network 120, process the unstructured information to generate structured information, store the information in a database 136, and/or transmit the information to the client devices 112A, 112B over the network 120. For example, the server 132 may be configured to receive physical inputs, video signals, audio signals, text data, user data, or any other data, analyze the received information, separate out and identify multiple speakers, and/or send identifying information or any other information pertaining to the separate speakers to the client devices 112A, 112B. In some embodiments, the server 132 is configured to generate a transcript, closed-captioning, speaker identification, and/or any other content featuring the separated speakers.

In some implementations, the functionality of the server 132 described in the present disclosure is distributed among one or more of the client devices 112A, 112B. For example, one or more of the client devices 112A, 112B may perform functions such as processing audio data for speaker separation. In some embodiments, the client devices 112A, 112B may share certain tasks with the server 132.

Database(s) 136 include one or more physical or virtual, structured or unstructured storages coupled with the server 132. The database 136 is configured to store a variety of data. For example, the database 136 stores communications data, such as audio, video, text, or any other form of communication data. The database 136 is also stores security data, such as access lists, permissions, and so forth. The database 136 also stores internal user data, such as names, positions, organizational charts, etc., as well as external user data, such as data from as Customer Relation Management (CRM) software, Enterprise Resource Planning (ERP) software, project management software, source code management software, or any other external or third-party sources. In some embodiments, the database 136 is also configured to store processed audio data, ML training data, or any other data. In some embodiments, the database 136 is stored in a cloud-based server (not shown) that is accessible by the server 132 and/or the client devices 112A, 112B through the network 120. While the database 136 is illustrated as an external device connected to the server 132, the database 136 may also reside within the server 132 as an internal component of the server 132.

3.0 FUNCTIONAL OVERVIEW

Figure 2:
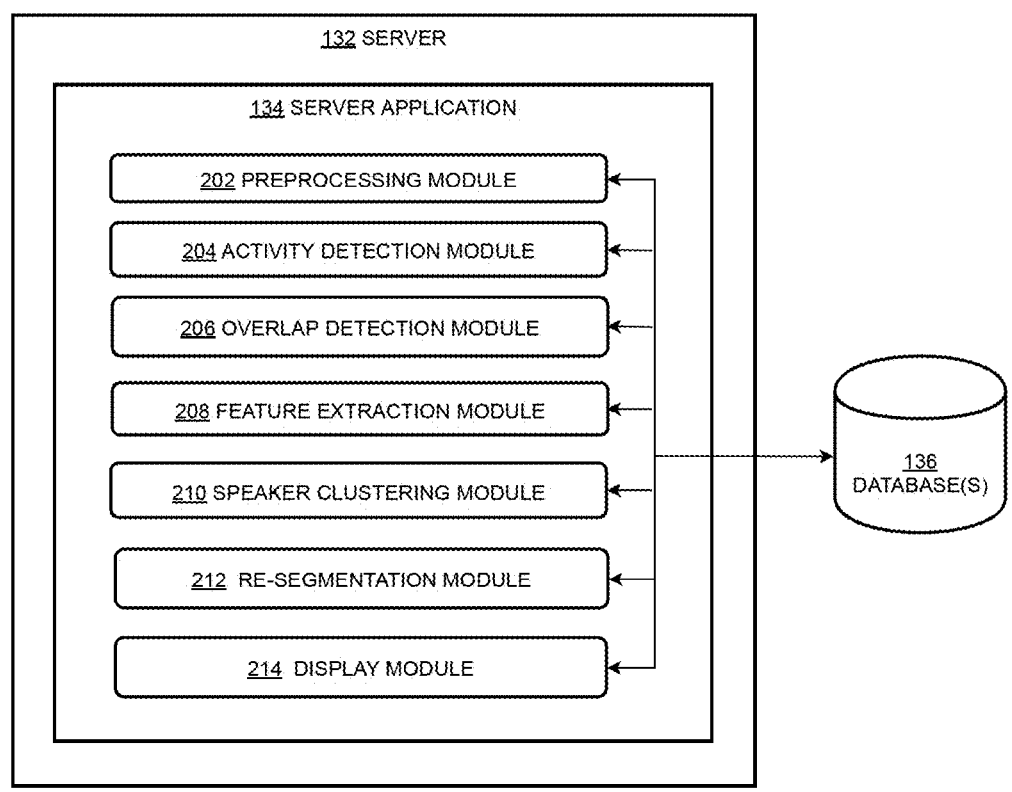
FIG. 2 is a diagram of a server system, in an example embodiment.

FIG. 2 is a diagram of a server system 200, such as server system 130 in FIG. 1, in an example embodiment. A server application 134 contains sets of instructions or modules which, when executed by one or more processors, perform various functions related to separating multiple speakers. In the example of FIG. 2, the server system 200 is configured with a preprocessing module 202, an activity detection module 204, an overlap detection module 206, a feature extraction module 208, a speaker clustering module 210, a re-segmentation module 212, and a display module 214, as further described herein. While seven modules are depicted in FIG. 2, the embodiment of FIG. 2 serves as an example and is not intended to be limiting. For example, fewer modules or more modules serving any number of purposes may be used.

One or more modules use ML algorithms or models. In some embodiments, all the above modules comprise of one or more ML models or implement ML techniques. For instances, any of the modules of FIG. 2 may be one or more: Voice Activity Detection (VAD) models, Gaussian Mixture Models (GMM), Deep Neural Networks (DNN), Time Delay Neural Networks (TDNN), Long Short-Term Memory (LSTM) networks, Agglomerative Hierarchical Clustering (AHC), Divisive Hierarchical Clustering (DHC), Hidden Markov Models (HMM), Natural Language Processing (NLP), Convolution Neural Networks (CNN), General Language Understanding Evaluation (GLUE), Word2Vec, Gated Recurrent Unit (GRU) networks, Hierarchical Attention Networks (HAN), or any other type of machine learning model. The models listed herein serve as examples and are not intended to be limiting.

In an embodiment, each of the machine learning models are trained on one or more types of data in order to separate multiple speakers. Using the neural network 300 of FIG. 3 as an example, a neural network 300 includes an input layer 310, one or more hidden layers 320, and an output layer 330 to train the model to perform various functions in relation to separating multiple speakers. In some embodiments, where the training data is labeled, supervised learning is used such that known input data, a weighted matrix, and known output data is used to gradually adjust the model to accurately compute the already known output. In other embodiments, where the training data is not labeled, unsupervised and/or semi-supervised learning is used such that a model attempts to reconstruct known input data over time in order to learn.

Training of example neural network 300 using one or more training input matrices, a weight matrix, and one or more known outputs is initiated by one or more computers associated with the ML modules. For example, one, some, or all of the modules of FIG. 2 may be trained by one or more training computers, and once trained, used in association with the server 132 and/or client devices 112A, 112B, to process live audio data for separating individual speakers. In an embodiment, a computing device may run known input data through a deep neural network in an attempt to compute a particular known output. For example, a server, such as server 132, uses a first training input matrix and a default weight matrix to compute an output. If the output of the deep neural network does not match the corresponding known output of the first training input matrix, the server 132 adjusts the weight matrix, such as by using stochastic gradient descent, to slowly adjust the weight matrix over time. The server 132 then re-computes another output from the deep neural network with the input training matrix and the adjusted weight matrix. This process continues until the computer output matches the corresponding known output. The server 132 then repeats this process for each training input dataset until a fully trained model is generated.

Figure 3:
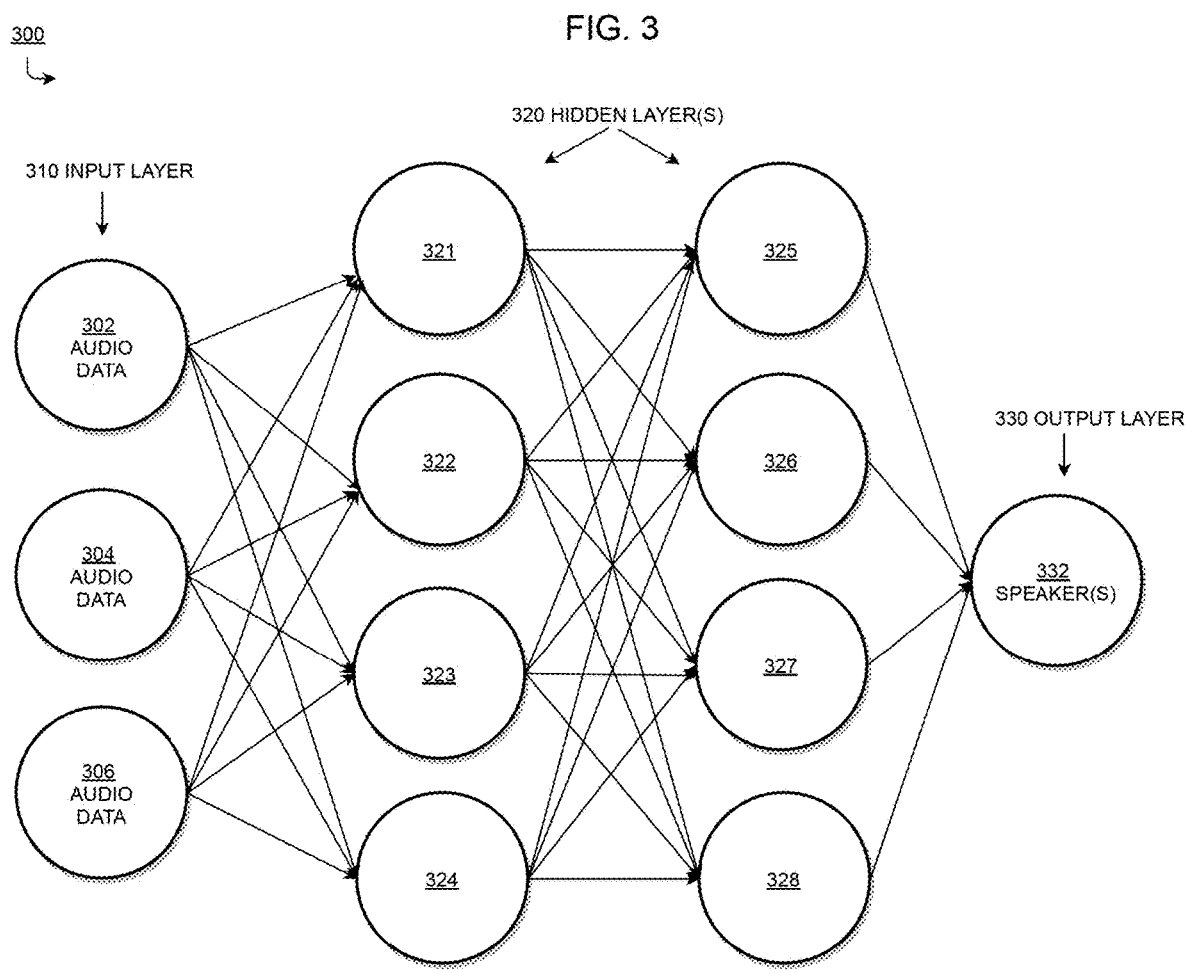
FIG. 3 is a relational node diagram depicting a neural network, in an example embodiment.

In the example of FIG. 3, the input layer 310 includes a plurality of training datasets that are stored as a plurality of training input matrices in an associated database, such as database 136 of FIG. 2. In some embodiments, the training datasets may be updated and the ML models retrained using the updated data. In some embodiments, the updated training data may include, for example, user feedback or other user input.

The training input data includes, for example, audio data 302, 304, 306. The audio data 302, 304, 306 includes a variety of audio data from different sources. The audio data 302, 304, 306 may feature silence, sounds, non-spoken sounds, background noises, white noise, spoken sounds, speakers of different genders with different speech patterns, or any other types of audio. While the example of FIG. 3 uses a single neural network, any number of neural networks may be used to train any number of ML models to separate speakers.

In the embodiment of FIG. 3, hidden layers 320 represent various computational nodes 321, 322, 323, 324, 325, 326, 327, 328. The lines between each node 321, 322, 323, 324, 325, 326, 327, 328 represent weighted relationships based on the weight matrix. As discussed above, the weight of each line is adjusted overtime as the model is trained. While the embodiment of FIG. 3 features two hidden layers 320, the number of hidden layers is not intended to be limiting. For example, one hidden layer, three hidden layers, ten hidden layers, or any other number of hidden layers may be used for a standard or deep neural network. The example of FIG. 3 also features an output layer 330 with speaker(s) 332 as the output. The speaker(s) 332 indicate one or more individual speakers that have been separated from the audio data 302, 304, 306. As discussed above, in this structured model, the speakers 332 are used as a target output for continuously adjusting the weighted relationships of the model. When the model successfully outputs the speakers 332, then the model has been trained and may be used to process live or field data.

Once the neural network 300 of FIG. 3 is trained, the trained model will accept field data at the input layer 310, such as audio data from current conferencing sessions. In some embodiments, the field data is live data that is accumulated in real time, such as a live audio-video conferencing session. In other embodiments, the field data may be current data that has been saved in an associated database, such as database 136. The trained model is applied to the field data in order to identify the one or more speakers 332 at the output layer 330. For instance, a trained model can separate out individual speakers based on environment, gender, or any other factor.

Figure 4:
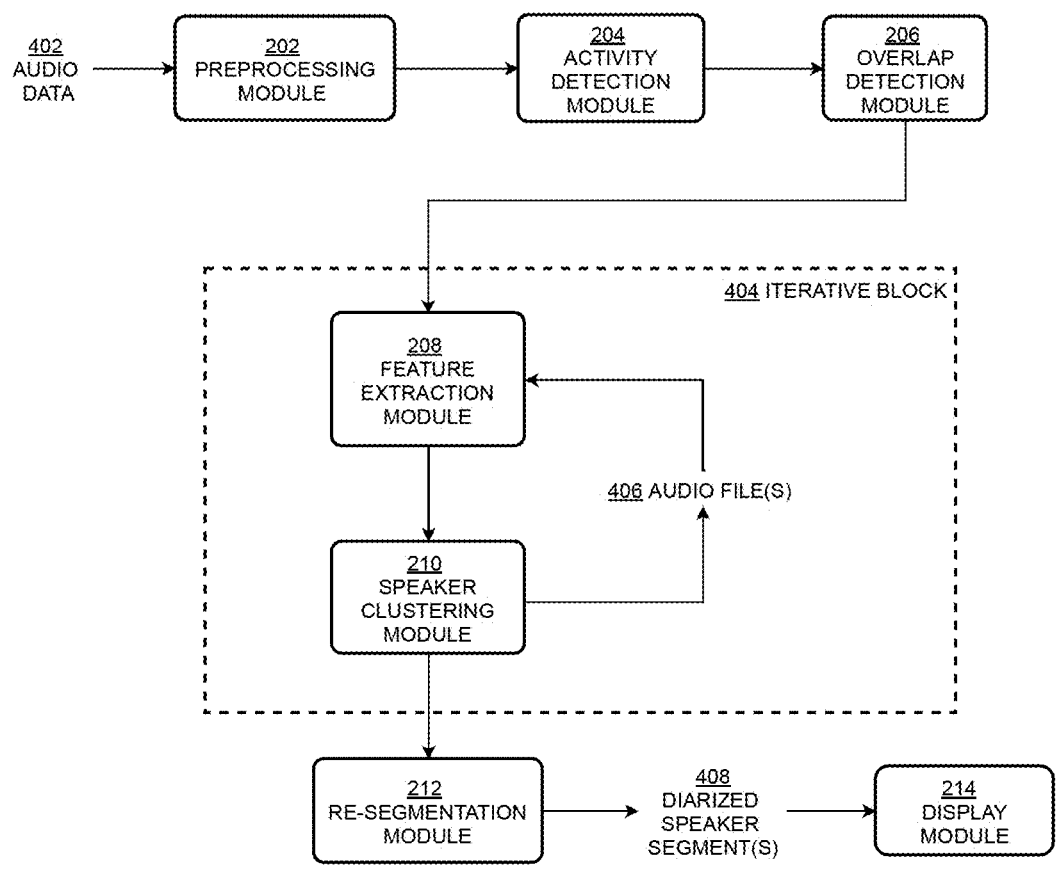
FIG. 4 is a block diagram of a speaker separation process, in an example embodiment.

FIG. 4 is a block diagram of a speaker separation process 400, in an example embodiment. The speaker separation process 400 may be understood in relation to the data preparation, the iterative hierarchical clustering analysis, and the re-segmentation steps, as further described herein.

3.1 Preparation

In some embodiments, audio data 402 is fed into a preprocessing module 202. The preprocessing module 202 normalizes the audio data 402 for subsequent processing by other modules. In some embodiments, normalizing the audio data 402 includes normalizing the data to standards in which the ML models are trained, thereby ensuring parity between the data used to train the ML models and the live audio data 402 fed into the server system 130. Some nonlimiting examples of preprocessing include remixing audio channels, such as remixing multiple channels into a single channel, down-sampling the audio to a predetermined sampling rate, adding or removing white noise, performing root mean square (RMS) normalization, or performing any other methods for normalization and standardization. Subsequently, the pre-processed audio data it sent to the activity detection module 204 for processing.

In an embodiment, the activity detection module 204 is a voice filter that detects and eliminates non-speech segments within the audio data. Non-speech audio segments include, for example, background noise, silence, or any other audio segments that do not include speech. In some embodiments, the activity detection module 204 extracts features from the pre-processed audio data from the preprocessing module 202. The features may be Mel-frequency cepstral coefficient (MFCC) features, which are then passed as input into one or more VAD models, for example. In some embodiments, a GMM model is trained to detect speech, silence, and/or background noise. In other embodiments, a DNN model is trained to enhance speech segments of the audio and/or detect the presence of a noise. In some embodiments, one or both GMM and DNN models are used while in other embodiments, other known ML learning techniques are used.

In some embodiments, the MFCC features extracted by the activity detection module 204 are passed to an overlap detection module 206. In an embodiment, the overlap detection module 206 is a filter that separates overlapping speech segments. Overlapping speech segments include, for example, more than one speaker in a single frame. In some embodiments, the overlap detection module 206 is a ML model, such as a TDNN model, that is trained to classify whether a frame has a single speaker or more than one speaker. In some embodiments, the model is also trained to distinguish between overlapping speakers and a new speaker such that overlapping speakers are not erroneously identified as new speakers. In some embodiments, the overlap detection module 206 is a LSTM model that uses raw audio data as input rather than MFCC features. The LSTM model performs sequence to sequence labeling in order to separate overlapping speakers. Following the overlap detection module 206, the audio data proceeds into an iterative block 404 for hierarchical clustering, which is described further herein.

3.2 Iterative Hierarchical Clustering Analysis

The iterative block 404 implements a hierarchical clustering analysis. In some embodiments, the iterative block 404 repeats a series of outer and inner processing loops on the audio data to separate out multiple speakers. In an embodiment, each iteration includes both the outer loop and the inner loop. In some embodiments, the outer loop is a top-down divisive hierarchical clustering (DHC) analysis performed by a trained ML feature extraction module 208. In some embodiments, the inner loop is a bottom-up agglomerative hierarchical clustering (AHC) analysis performed by a trained ML speaker clustering module 210. The hierarchical clustering techniques are examples only and are not intended to be limiting.

In some instances, during the DHC outer loop, the feature extraction module 208 takes the audio data as the input and divides the audio data based on patterns or features that the feature extraction module 208 is trained to detect. In some instances, during the AHC inner loop, the speaker clustering module 210 identifies the speakers and splits the audio data into audio files 406 based on those relevant patterns or features determined by the feature extraction module 208. In some embodiments, the audio files 406 are homogenous audio files. The outer loop and inner loop are repeated through the iterative block 404 to separate and break down the audio files until each individual speaker is identified and separated. In some embodiments, three iterations of the outer and inner loops are implemented to obtain the output of separated speakers. In other embodiments, two iterations, four iterations, five iterations, or any other number of iterations may be implemented. In instances where three iterations are used, the first iteration may first separate out speakers by their environments, the second iteration may take each of those environments and further separate out speakers by genders, and the third iteration may take each of those genders and further separate out each individual speaker. The features or patterns that each speaker is separated by are examples only and are not intended to be limiting; as such, each iteration may separate speakers based on any type of feature and is not limited to environment, gender, etc. This speaker separation process 400 of FIG. 4 may be understood in relation to the example of FIG. 5.

Figure 5:
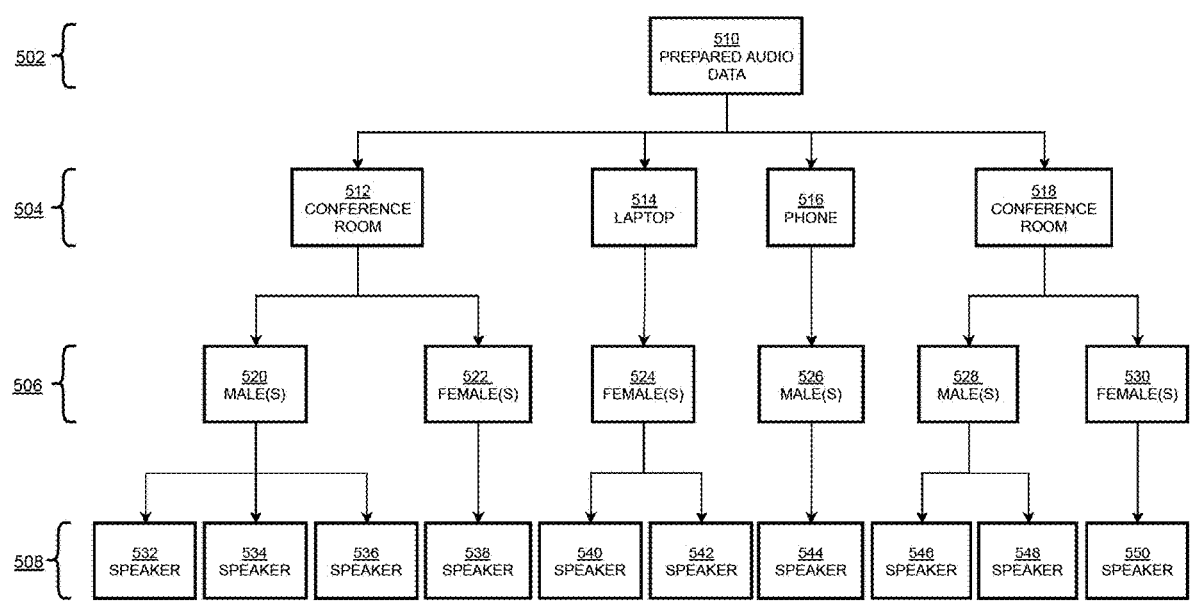
FIG. 5 is a block diagram of speaker separation, in an example embodiment.

FIG. 5 is a block diagram of speaker separation 500, in an example embodiment. During the first iteration 502, the prepared audio data 510 that was processed using the preprocessing module 202, activity detection module 204, and/or overlap detection module 206 are fed into the feature extraction module 208 and speaker clustering module 210 of FIG. 4 for the first round of DHC and AHC analysis. In some embodiments, this prepared audio data 510 is a single audio file featuring all speakers. In some embodiments, the prepared audio data 510 is a near-real-time or real-time audio feed. In some embodiments, the prepared audio data 510 is a root node that features speaker timestamps that the feature extraction module 208 uses to compare timestamps from subsequently separated audio data to. The feature extraction module 208 listens for background signals in order to separate the audio based on the environment. This may include, for example, the background sounds of people talking, dogs barking, music playing, white noise, or any other background signals that may distinguish one speaker's environment from another speaker's environment. The feature extraction module 208 may also compare the audio data timestamps corresponding to each background signal to the timestamps from the prepared audio data 510 prior to passing the sending the audio data to the speaker clustering module 210. The speaker clustering module 210 then breaks the audio down into individual audio files 406 in accordance with the separated environments. In the example of FIG. 5, the separated audio files 406 belong to four different identified environments: conference room 512, laptop 514, phone 516, and conference room 518. This means that speakers can be found within each of these four different environments. While four environments are shown in the example of FIG. 5, any number of environments may be identified and separated.

During the second iteration 504, each audio file 406 associated with the conference room 512, laptop 514, phone 516, and conference room 518, respectively, are fed into the feature extraction module 208 and speaker clustering module 210 of FIG. 4 for the second round of DHC and AHC analysis. The feature extraction module 208 extracts features for gender detection from each of these audio files associated with separate environments. The feature extraction module 208 may also compare the audio data timestamps corresponding to the gender features to the timestamps from the prepared audio data 510 prior to passing the sending the audio data to the speaker clustering module 210. The speaker clustering module 210 further breaks the audio down into individual audio files 406 in accordance with the genders detected within each of the separate environments. In the example of FIG. 5, the separated audio files 406 of the second iteration correspond to six speaker groups that have been separated by gender within each separate environment: male(s) 520, female(s) 522, female(s) 524, male(s) 526, male(s) 528, and female(s) 530. This means that one or more speakers of the identified gender are located within their respective environments. While six gender groups are shown in the example of FIG. 5, any number of gender groups may be identified and separated.

During the third iteration 506, each audio file 406 associated with gender groups identified during the second iteration 504 are again fed into the feature extraction module 208 and speaker clustering module 210 of FIG. 4 for the third round of DHC and AHC analysis. The feature extraction module 208 extracts DNN speaker embeddings in accordance with known ML techniques and is trained to differentiate one speaker from another. The feature extraction module 208 may also compare the audio data timestamps corresponding to individual speakers to the timestamps from the prepared audio data 510 prior to passing the sending the audio data to the speaker clustering module 210. The speaker clustering module 210 further breaks the audio down into audio files 406 associated with each individual speaker from the gender groups and the separate environments. In the example of FIG. 5, the final output 508 includes ten separated audio files 406 corresponding to ten individual speakers: speaker 532, 534, 536, 538, 540, 542, 544, 546, 548, 550.

Returning to FIG. 4, in some embodiments, the iterative block 404 stops upon meeting one or more stopping criteria. For the feature extraction module 208 performing DHC, the stopping criteria may be, for example, a specific number of iterations. While three iterations are used in the example of FIG. 5, any number of iterations may be implemented. For example, if the individual speakers can be separated using two iterations, then the stopping criteria for the feature extraction module 208 may be set at two iterations. For the speaker clustering module 210 performing AHC, the stopping criteria may be, for example, meeting a score threshold. Since clusters are merged if their distance is less than a certain threshold, the process continues until all clusters are greater than this score threshold. Since the same score threshold is not universally applicable across all scenarios, AHC may be performed using a list of thresholds, where the appropriate threshold is applied for the appropriate scenario. In some embodiments, the most appropriate threshold for any given scenario is chosen based on a variance ratio criterion, which is a metric for determining cluster purity.

3.3 Re-Segmentation and Display

Upon meeting the stopping criteria, the audio files featuring all the separated speakers are fed into the re-segmentation module 212, in some embodiments. In an embodiment, the re-segmentation module 212 refines the speaker separation output from the iterative block 404 and generates the final speaker diarized segments 408 as the output. For example, the individual speaker patterns extracted by the speaker clustering modules 210 are rough and lack refinement with regards to boundaries that separate one speaker from another. To further refine these speaker boundaries, a machine learning model such as Variable Bayes re-segmentation or Viterbi re-segmentation may be used. In some embodiments, the re-segmentation module 212 also re-maps the timestamps of the speakers from the original audio file to the audio files that were split due to the DHC process. This generates complete diarized speaker segment(s) 408 featuring a record of which speaker spoke at each specific time during the meeting.

In some embodiments, the re-segmentation module 212 is configured to generate a transcript featuring the separated speakers, speaker labels or identifications, closed-captioning of live meetings, and/or any other content featuring the separated speakers generated by the re-segmentation module 212. In some embodiments, this includes formatting the diarized speaker segments 408 into these various types of content featuring the separated speakers, storing these segments or the formatted content in database 136, and/or sending the segments or formatted content to a display module 214 for subsequent display, as further described herein.

In an embodiment, the diarized speaker segments 408 or any other content generated by the diarized speaker segments 408, such as transcripts, closed captioning and so forth, are provided to a display module 214 for displaying to one or more users, such as user 110A, 110B. In some embodiments, upon receiving a request sent from client device 112A, 112B, the transcripts or other speaker information is retrieved from database 136 and sent to the client device 112A, 112B for subsequent display. In an embodiment, the display module 214 may display the closed captioning, transcripts, speaker identities, or any other information in real time, such as during a live conferencing session.

4.0 PROCEDURAL OVERVIEW

Figure 6:
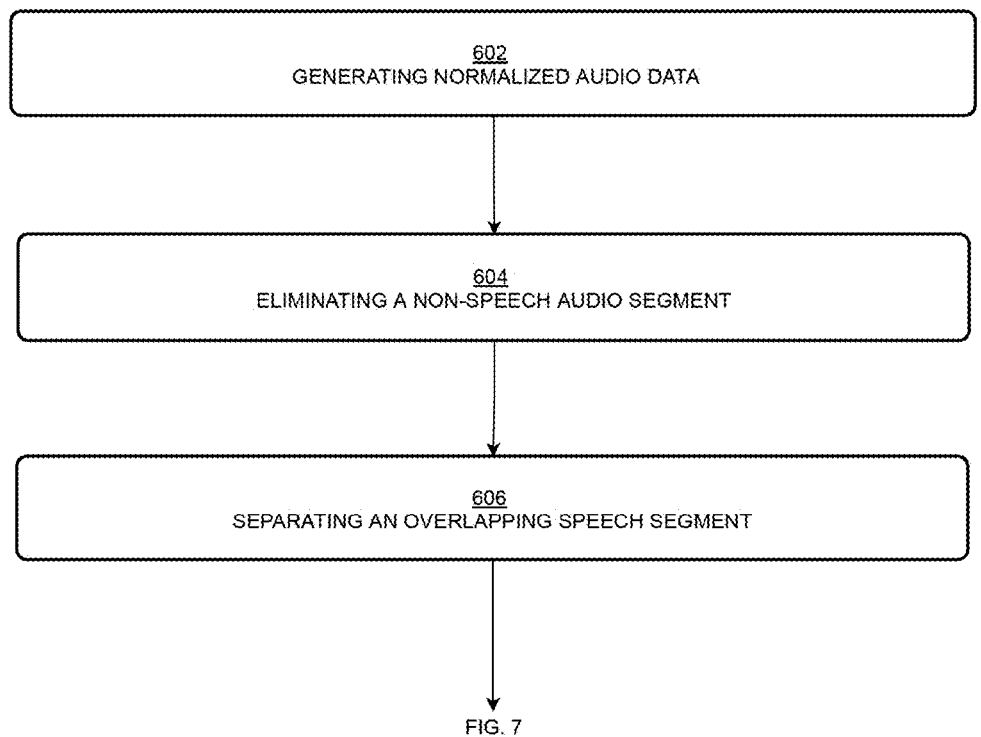
FIG. 6 is a flowchart depicting an audio preparation process for separating multiple speakers, in an example embodiment.

FIG. 6 is a flowchart depicting an audio preparation process 600 for separating multiple speakers, in an example embodiment. In some embodiments, the server 132 of FIG. 1 is configured to implement each of the following steps in the audio preparation process 600.

At step 602, audio data is normalized. In some embodiments, the audio data is normalized to standards that the ML models were trained on. Normalization may include, for example, remixing audio channels, down-sampling, adding or removing white noise, RMS normalization, or any other normalization and standardization methods. In some embodiments, step 602 is performed by the preprocessing module 202, as described herein in relation to FIG. 2 and FIG. 4.

In some embodiments, at step 604, non-speech audio segments are eliminated following the normalization. In some embodiments, non-speech segments may include background noise, silence, non-human sounds, or any other audio segments that do not include speech. Eliminating non-speech audio segments enables only audio featuring speech to be processed for speaker separation. In some embodiments, step 604 is performed by the activity detection module 204, as described herein in relation to FIG. 2 and FIG. 4.

At step 606, overlapping speech segments are separated, in some embodiments. In some embodiments, overlapping speech segments occur when more than one speaker is featured in a single frame. Upon detecting more than one speaker in a frame, the speech segments featuring multiple speakers are separated for further processing, in accordance with the steps of FIG. 7. In some embodiments, step 606 is performed by the overlap detection module 206, as described herein in relation to FIG. 2 and FIG. 4.

Figure 7:
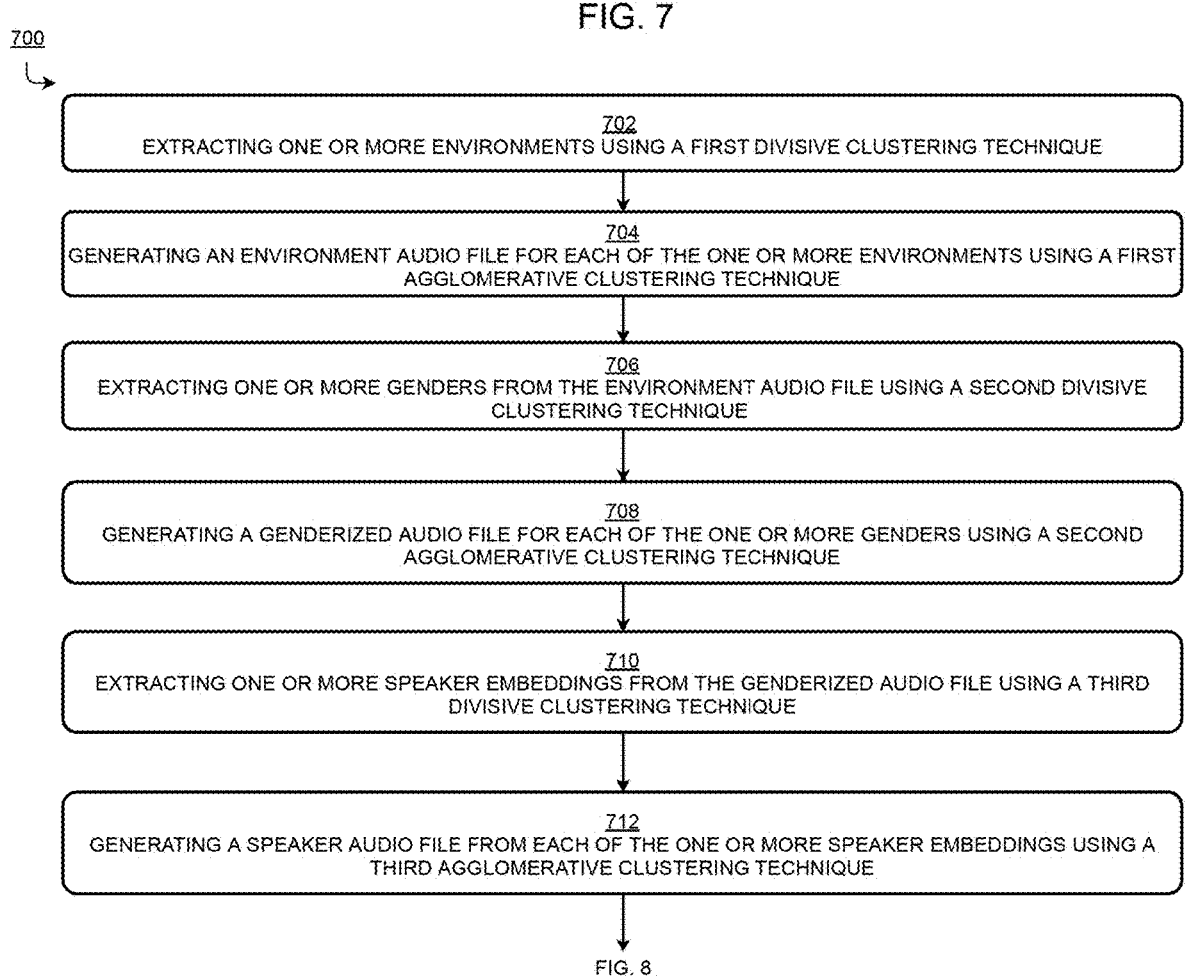
FIG. 7 is a flowchart depicting an iterative block for separating multiple speakers, in an example embodiment.

FIG. 7 is a flowchart 700 depicting an iterative block 404 for separating multiple speakers, in an example embodiment. The prepared audio data from audio preparation process 600 of FIG. 6 is funneled into this iterative block to separate out individual speakers.

At step 702, one or more environments are extracted using a first divisive clustering technique. The environment may be, for example, one or more conference rooms that speakers are calling from, a laptop in an indoor environment, a phone in an outdoor environment, a laptop in a coffee shop, a phone in a car, or any other environment that a speaker may be joining the conferencing session from. The divisive clustering technique is a divisive hierarchical clustering analysis which is done using a trained ML model. The trained ML model is trained to divide out these separate environments for subsequent analysis.

At step 704, an environment audio file is generated for each of the one or more environments using a first agglomerative clustering technique. The environment audio file may be audio data featuring speakers located in each of the extracted environments. The agglomerative clustering technique is an agglomerative hierarchical clustering analysis which is done using a trained ML model. In some embodiments, the combination of steps 702 and 704 may be done in a first iteration of the iterative block 404, in an example embodiment. This first iteration separates out speakers into separate audio files based on their environments before the data proceeds through one or more additional iterations for further separation. In some embodiments, the agglomerative clustering is seeded with the output from the divisive clustering to ensure the best possible clustering for the separated file(s).

At step 706, one or more genders are extracted from the environment audio file using a second divisive clustering technique. The genders may be, for example, separated into male or female groups. In some embodiments, where multiple speakers have joined from the same environment such as a large conference room, multiple male speakers may be extracted and grouped together as males while multiple female speakers may be extracted and grouped together as females. The divisive clustering technique is a divisive hierarchical clustering analysis which is done using a trained ML model. The trained ML model is trained to divide out these separate gender groups for subsequent analysis. Since this divisive clustering technique is performed after the first iteration that determines different environments, the gender division is dependent upon each environment.

At step 708, a gendered audio file for each of the one or more genders is generated using a second agglomerative clustering technique. The gendered audio file may be audio data featuring speakers that are grouped together by gender. The agglomerative clustering technique is an agglomerative hierarchical clustering analysis which is done using a trained ML model. In some embodiments, the combination of steps 706 and 708 may be done in a second iteration of the iterative block, in an example embodiment. This second iteration separates out speakers into separate audio files based on their genders before the data proceeds through one or more additional iterations for further separation. In some embodiments, the agglomerative clustering is seeded with the output from the divisive clustering to ensure the best possible clustering for the separated file(s).

At step 710, one or more speaker embeddings are extracted from the gendered audio file using a third divisive clustering technique. A speaker embedding may be, for example, a space for capturing similar inputs in an effort to simplify the machine learning process for larger inputs. The divisive clustering technique is a divisive hierarchical clustering analysis which is done using a trained ML model. The trained ML model is trained to divide out these each separate speaker. Since this divisive clustering technique is performed after the second iteration that determines different genders and after the first iteration that determines different environments, this speaker division is dependent upon both the genders and environments determined in the previous steps of the iterative block 700.

At step 712, a speaker audio file is generated from each of the one or more speaker embeddings using a third agglomerative clustering technique. A speaker audio file may be audio data pertaining to each individual speaker that has been separated stepwise through each of the previous steps in the iterative block 700. The agglomerative clustering technique is an agglomerative hierarchical clustering analysis which is done using a trained ML model. In some embodiments, the combination of steps 710 and 712 may be done in a third iteration of the iterative block, in an example embodiment. This third iteration separates out each individual speaker into separate audio files before the data is re-segmented, as further described in relation to FIG. 8.

Figure 8:
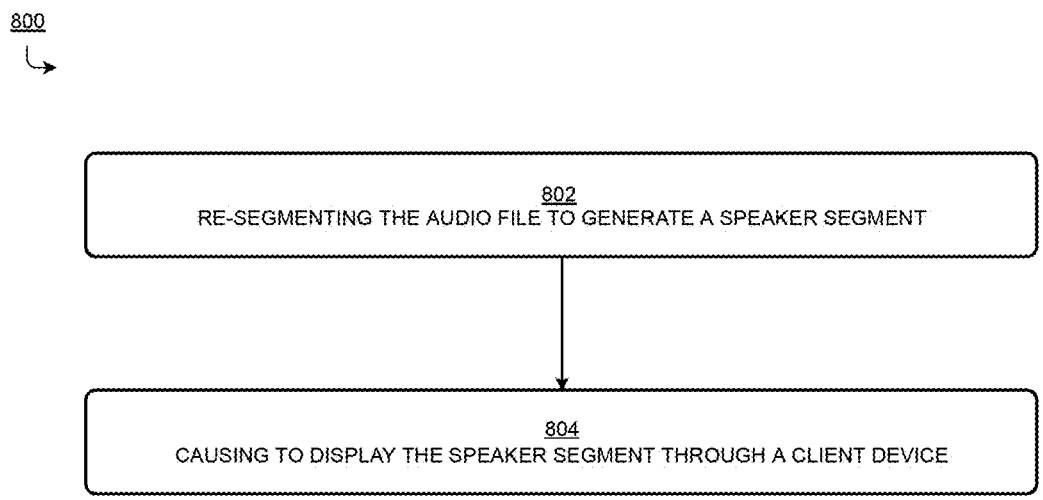
FIG. 8 is a flowchart depicting a re-segmentation and display of separated speakers, in an example embodiment.

FIG. 8 is a flowchart 800 depicting a re-segmentation and display of separated speakers, in an example embodiment. At step 802, the audio files corresponding to each of the separate speakers determined through the process 700 of FIG. 7 are re-segmented to generate a speaker segment. Re-segmentation may include, for example, refining boundaries that separate one speaker from another using known ML techniques. Re-segmentation may also include re-mapping timestamps from the original audio file to these individual speaker files to generate speaker segment(s). The speaker segment may be, for example, a diarized segment that includes timestamps of when each speaker spoke. In some embodiments, a transcript, closed-captioning, speaker identifiers, or other speaker-related information may be generated using the speaker segments. At step 804, this content may subsequently be displayed through client devices 112A, 112B.

Figure 9:
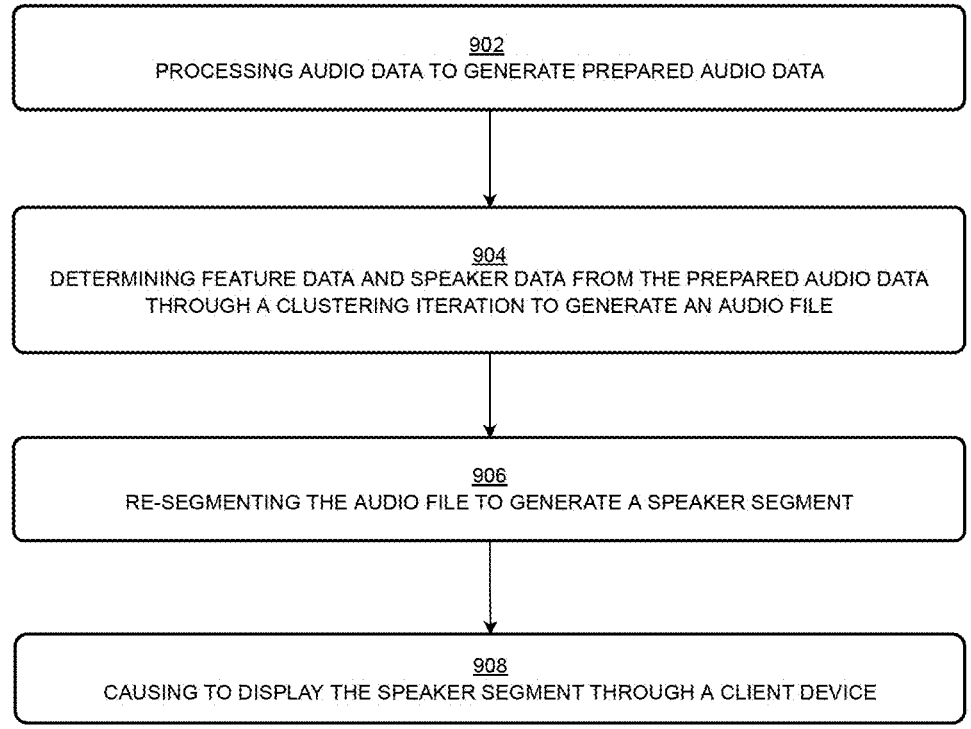
FIG. 9 is a flowchart depicting a speaker separation process, in an example embodiment.

FIG. 9 is a flowchart 900 depicting a speaker separation process, in an example embodiment. At step 902, audio data is processed to generate prepared audio data. In an embodiment, the audio data may be audio data from a live conferencing session featuring one or more speakers. The processing may include, for example, generating normalized audio data, eliminating non-speech audio segments, and/or separating overlapping speech segments.

At step 904, feature data and speaker data are determined from the prepared audio data. In some embodiments, the feature data and speaker data are determined through one or more clustering iterations. In some embodiments, a first clustering iteration identifies different environments from the audio data and separates out speakers based on the different environments. In some embodiments, a second clustering iteration identifies different genders from within the different environments and separates out speakers based on the different genders within the different environments. In some embodiments, a third clustering iteration identifies speaker embeddings from those genders and separates out the individual speakers. In some embodiments, the output from these one or more iterations of machine learning hierarchical clustering is one or more audio files featuring separated speakers.

At step 906, the one or more audio files from step 904 are re-segmented to generate a speaker segment. The re-segmentation may include, for example, refining boundaries that separate one speaker from another, re-mapping timestamps from the original audio file to these individual speaker files to generate diarized speaker segment(s), and/or generating transcripts, closed-captioning, speaker identifiers, or other speaker-related information using the diarized speaker segments.

At step 908, the server 132 may cause the speaker segment to be displayed through a client device. The client device may be the client device 112A, 112B of FIG. 1, for example. In some embodiments, a user 110A, 110B may initiate a transcription, closed-captioning, speaker identification, or any other request using a user interface. The server 132 may receive the request and activate the speaker separation process 900 to properly identify each individual speaker during a live conferencing session and subsequently provide transcription, closed-captioning, or any other information requested by the user 110A, 110B.

Figure 10:
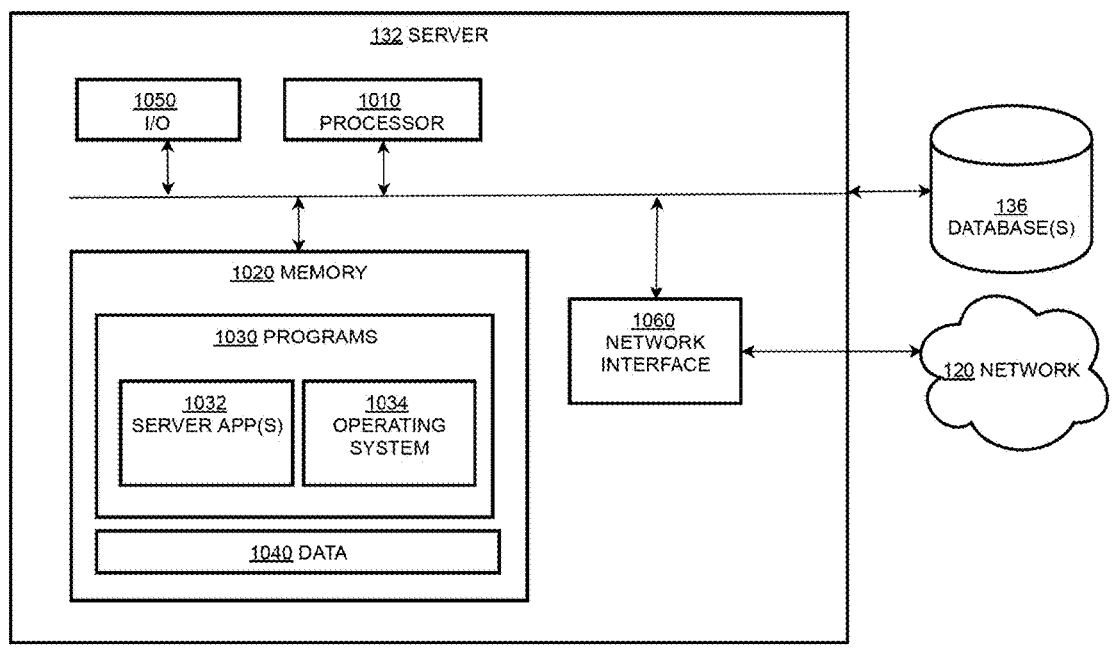
FIG. 10 is a diagram of an example conference server, in an example embodiment.

FIG. 10 shows a diagram of an example conference server 132, consistent with the disclosed embodiments. The server 132 includes a bus 1002 (or other communication mechanism) which interconnects subsystems and components for transferring information within the server 132. As shown, the server 132 may include one or more processors 1010, input/output ("I/O") devices 1050, network interface 1060 (e.g., a modem, Ethernet card, or any other interface configured to exchange data with a network), and one or more memories 1020 storing programs 1030 including, for example, server app(s) 1032, operating system 1034, and data 1040, and can communicate with an external database 136 (which, for some embodiments, may be included within the server 132). The server 132 may be a single server or may be configured as a distributed computer system including multiple servers, server farms, clouds, or computers that interoperate to perform one or more of the processes and functionalities associated with the disclosed embodiments.

The processor 1010 may be one or more processing devices configured to perform functions of the disclosed methods, such as a microprocessor manufactured by Intel™ or manufactured by AMD™. The processor 1010 may comprise a single core or multiple core processors executing parallel processes simultaneously. For example, the processor 1010 may be a single core processor configured with virtual processing technologies. In certain embodiments, the processor 1010 may use logical processors to simultaneously execute and control multiple processes. The processor 1010 may implement virtual machine technologies, or other technologies to provide the ability to execute, control, run, manipulate, store, etc. multiple software processes, applications, programs, etc. In some embodiments, the processor 1010 may include a multiple-core processor arrangement (e.g., dual, quad core, etc.) configured to provide parallel processing functionalities to allow the server 132 to execute multiple processes simultaneously. It is appreciated that other types of processor arrangements could be implemented that provide for the capabilities disclosed herein.

The memory 1020 may be a volatile or non-volatile, magnetic, semiconductor, tape, optical, removable, non-removable, or other type of storage device or tangible or non-transitory computer-readable medium that stores one or more program(s) 1030 such as server apps 1032 and operating system 1034, and data 1040. Common forms of non-transitory media include, for example, a flash drive a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

The server 132 may include one or more storage devices configured to store information used by processor 1010 (or other components) to perform certain functions related to the disclosed embodiments. For example, the server 132 includes memory 1020 that includes instructions to enable the processor 1010 to execute one or more applications, such as server apps 1032, operating system 1034, and any other type of application or software known to be available on computer systems. Alternatively or additionally, the instructions, application programs, etc. are stored in an external database 136 (which can also be internal to the server 132) or external storage communicatively coupled with the server 132 (not shown), such as one or more database or memory accessible over the network 120.

The database 136 or other external storage may be a volatile or non-volatile, magnetic, semiconductor, tape, optical, removable, non-removable, or other type of storage device or tangible or non-transitory computer-readable medium. The memory 1020 and database 136 may include one or more memory devices that store data and instructions used to perform one or more features of the disclosed embodiments. The memory 1020 and database 136 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, the server 132 may be communicatively connected to one or more remote memory devices (e.g., remote databases (not shown)) through network 120 or a different network. The remote memory devices can be configured to store information that the server 132 can access and/or manage. By way of example, the remote memory devices could be document management systems, Microsoft SQL database, SharePoint databases, Oracle™ databases, Sybase™ databases, or other relational databases. Systems and methods consistent with disclosed embodiments, however, are not limited to separate databases or even to the use of a database.

The programs 1030 include one or more software modules causing processor 1010 to perform one or more functions of the disclosed embodiments. Moreover, the processor 1010 may execute one or more programs located remotely from one or more components of the communications system 100. For example, the server 132 may access one or more remote programs that, when executed, perform functions related to disclosed embodiments.

In the presently described embodiment, server app(s) 1032 causes the processor 1010 to perform one or more functions of the disclosed methods. For example, the server app(s) 1032 may cause the processor 1010 to analyze different types of audio communications to separate multiple speakers from the audio data and send the separated speakers to one or more users in the form of transcripts, closed-captioning, speaker identifiers, or any other type of speaker information. In some embodiments, other components of the communications system 100 may be configured to perform one or more functions of the disclosed methods. For example, client devices 112A, 112B may be configured to separate multiple speakers from the audio data and send the separated speakers to one or more users in the form of transcripts, closed-captioning, speaker identifiers, or any other type of speaker information.

In some embodiments, the program(s) 1030 may include the operating system 1034 performing operating system functions when executed by one or more processors such as the processor 1010. By way of example, the operating system 1034 may include Microsoft Windows™, Unix™, Linux™, Apple™ operating systems, Personal Digital Assistant (PDA) type operating systems, such as Apple iOS, Google Android, Blackberry OS, Microsoft CE™, or other types of operating systems. Accordingly, disclosed embodiments may operate and function with computer systems running any type of operating system 1034. The server 132 may also include software that, when executed by a processor, provides communications with network 120 through the network interface 1060 and/or a direct connection to one or more client devices 112A, 112B.

In some embodiments, the data 1040 includes, for example, audio data, which may include silence, sounds, non-speech sounds, speech sounds, or any other type of audio data.

The server 132 may also include one or more I/O devices 1050 having one or more interfaces for receiving signals or input from devices and providing signals or output to one or more devices that allow data to be received and/or transmitted by the server 132. For example, the server 132 may include interface components for interfacing with one or more input devices, such as one or more keyboards, mouse devices, and the like, that enable the server 132 to receive input from an operator or administrator (not shown).

What is claimed is:

1. A computer-implemented machine learning method for improving speaker separation, the method comprising:
    processing audio data to generate prepared audio data, wherein processing the audio data comprises eliminating one or more non-speech audio segments;
    determining feature data and speaker data from the prepared audio data through a clustering iteration to generate an audio file;
    determining a plurality of environments associated with the audio data based on the feature data, wherein the feature data includes background sounds used to distinguish environments of the plurality of environments, and wherein the clustering iteration comprises sequentially performing:
        applying a divisive hierarchical clustering to divide out the audio file based on the determined plurality of environments to form a plurality of audio files, wherein each audio file of the plurality of audio files is associated with an environment of the plurality of environments;
        subsequent to forming the plurality of audio files, applying agglomerative hierarchical clustering to divide out speakers and obtain the speaker data within each respective audio file of the plurality of audio files;
    subsequent to performing the clustering iteration, re-segmenting the plurality of audio files to generate a speaker segment based on the agglomerative hierarchical clustering applied to each audio file of the plurality of audio files; and
    causing to display the speaker segment through a client device.

2. The computer-implemented machine learning method of claim 1, wherein determining feature data comprises determining a gender using machine learning.

3. The computer-implemented machine learning method of claim 1, wherein determining speaker data comprises extracting speaker data from the determined environment using machine learning.

4. The computer-implemented machine learning method of claim 1, wherein processing the audio data comprises generating normalized audio data.

5. The computer-implemented machine learning method of claim 1, wherein processing the audio data comprises eliminating one or more non-speech audio segments before processing remaining audio data to generate prepared audio data.

6. The computer-implemented machine learning method of claim 1, wherein processing the audio data comprises separating an overlapping speech segment.

7. A non-transitory, computer-readable medium storing a set of instructions that, when executed by a processor, cause:
    processing audio data to generate prepared audio data, wherein processing the audio data comprises eliminating one or more non-speech audio segments;
    determining feature data and speaker data from the prepared audio data through a clustering iteration to generate an audio file;
    determining a plurality of environments associated with the audio data based on the feature data, wherein the feature data includes background sounds used to distinguish environments of the plurality of environments, and wherein the clustering iteration comprises sequentially performing:
    applying a divisive hierarchical clustering to divide out the audio file based on the determined plurality of environments to form a plurality of audio files, wherein each audio file of the plurality of audio files is associated with an environment of the plurality of environments;
    subsequent to forming the plurality of audio files, applying agglomerative hierarchical clustering to divide out speakers and obtain the speaker data within each respective audio file of the plurality of audio files;
    subsequent to performing the clustering iteration, re-segmenting the plurality of audio files to generate a speaker segment based on the agglomerative hierarchical clustering applied to each audio file of the plurality of audio files; and
    causing to display the speaker segment through a client device.

8. The non-transitory, computer-readable medium of claim 7, wherein determining feature data comprises determining a gender using machine learning.

9. The non-transitory, computer-readable medium of claim 7, wherein determining speaker data comprises extracting speaker data from the determined environment using machine learning.

10. The non-transitory, computer-readable medium of claim 7, wherein processing the audio data comprises generating normalized audio data.

11. The non-transitory, computer-readable medium of claim 7, wherein processing the audio data comprises eliminating one or more non-speech audio segments before processing remaining audio data to generate prepared audio data.

12. The non-transitory, computer-readable medium of claim 7, wherein processing the audio data comprises separating an overlapping speech segment.

13. A machine learning system for improving speaker separation, the system comprising:
 a processor;
 a memory storing instructions that, when executed by the processor, cause:
  processing audio data to generate prepared audio data, wherein processing the audio data comprises eliminating one or more non-speech audio segments;
  determining feature data and speaker data from the prepared audio data through a clustering iteration to generate an audio file;
  determining a plurality of environments associated with the audio data based on the feature data, wherein the feature data includes background sounds used to distinguish environments of the plurality of environments, and wherein the clustering iteration comprises sequentially performing:
  applying a divisive hierarchical clustering to divide out the audio file based on the determined plurality of environments to form a plurality of audio files, wherein each audio file of the plurality of audio files is associated with an environment of the plurality of environments;
  subsequent to forming the plurality of audio files, applying agglomerative hierarchical clustering to divide out speakers and obtain the speaker data within each respective audio file of the plurality of audio files;
  subsequent to performing the clustering iteration, re-segmenting the plurality of audio files to generate a speaker segment based on the agglomerative hierarchical clustering applied to each audio file of the plurality of audio files; and
  causing to display the speaker segment through a client device.

14. The machine learning system of claim 13, wherein determining feature data comprises determining a gender using machine learning.

15. The machine learning system of claim 13, wherein determining speaker data comprises extracting speaker data from the determined environment using machine learning.

16. The machine learning system of claim 13, wherein processing the audio data comprises generating normalized audio data.

17. The machine learning system of claim 13, wherein processing the audio data comprises eliminating one or more non-speech audio segments before processing remaining audio data to generate prepared audio data.

18. The machine learning system of claim 13, wherein processing the audio data comprises separating an overlapping speech segment.

* * * * *